DE WITT NELSON.
PORTABLE LOADER.
APPLICATION FILED MAY 20, 1919.
1,381,585.
Patented June 14, 1921.
4 SHEETS—SHEET 1.
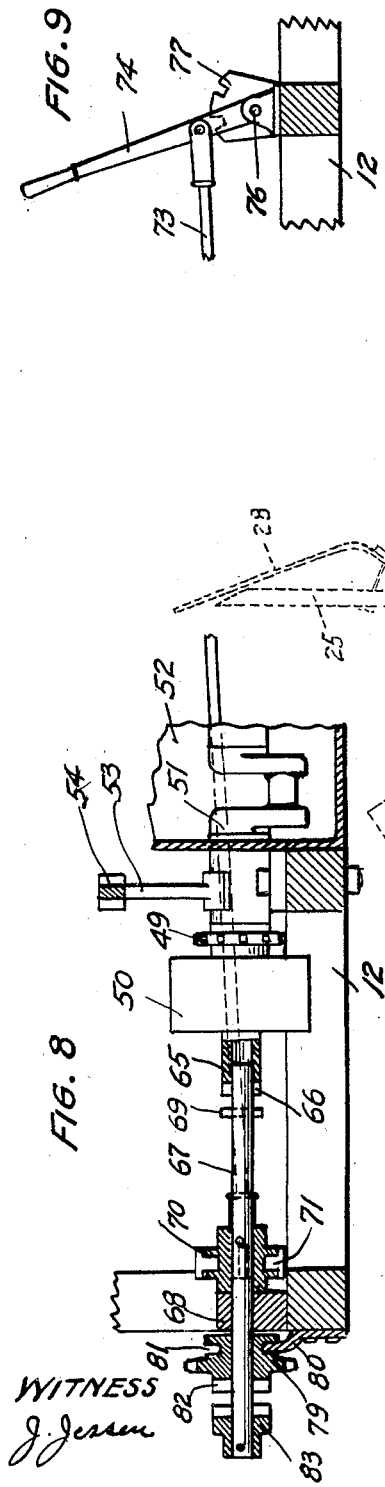
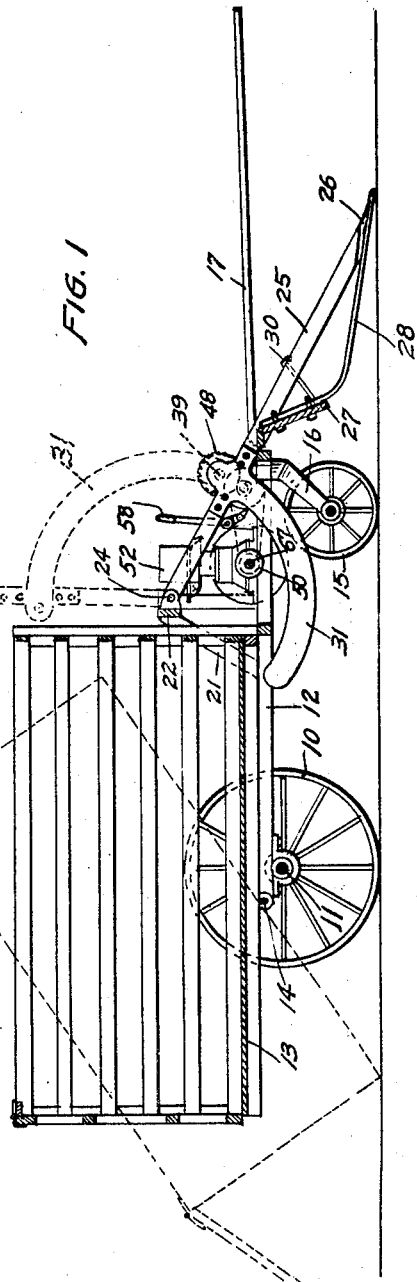
INVENTOR
DE WITT NELSON
BY Paul & Paul
ATTORNEYS
WITNESS
J. Jessen

DE WITT NELSON.
PORTABLE LOADER.
APPLICATION FILED MAY 20, 1919.

1,381,585.

Patented June 14, 1921.
4 SHEETS—SHEET 2.

FIG. 2

WITNESS
J. Jessen

INVENTOR
DE WITT NELSON
BY Paul Haus
ATTORNEYS

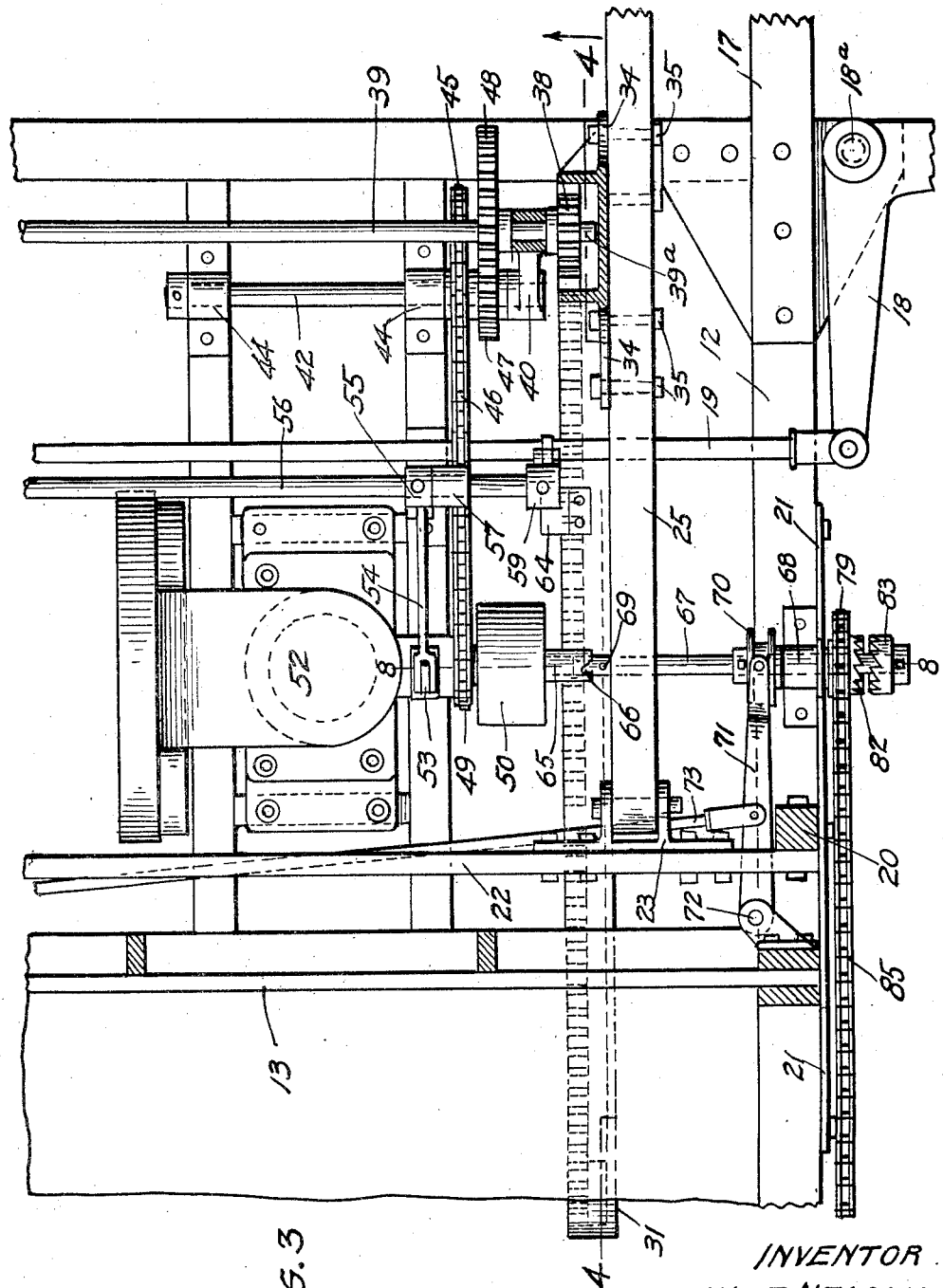

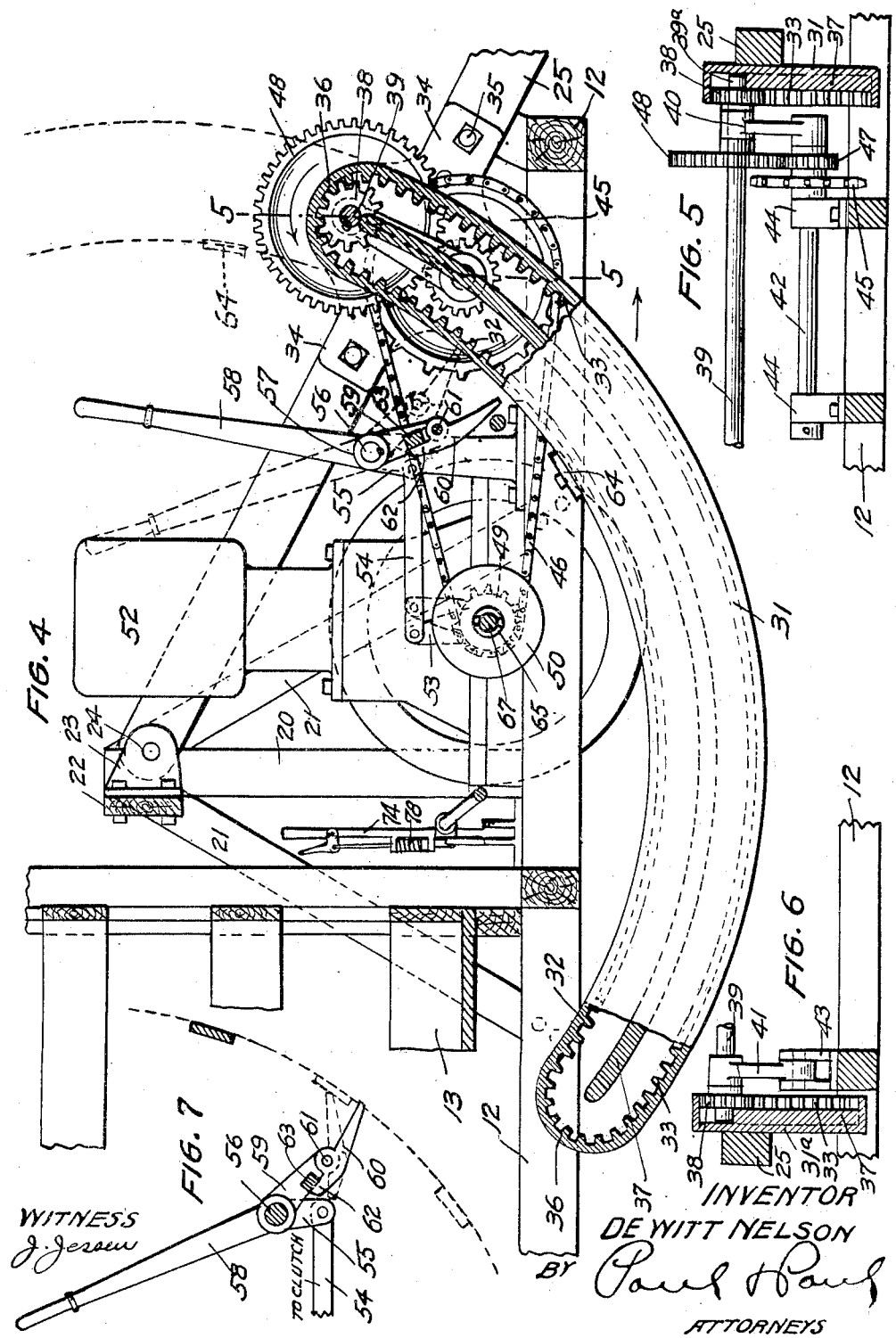

UNITED STATES PATENT OFFICE.

DE WITT NELSON, OF MINNEAPOLIS, MINNESOTA, ASSIGNOR OF ONE-THIRD TO P. J. LYONS, OF MINNEAPOLIS, MINNESOTA, AND ONE-THIRD TO JOHN F. ROBINSON, OF STEELE, NORTH DAKOTA.

PORTABLE LOADER.

1,381,585.      Specification of Letters Patent.      Patented June 14, 1921.

Application filed May 20, 1919. Serial No. 298,486.

*To all whom it may concern:*

Be it known that I, DE WITT NELSON, citizen of the United States, resident of Minneapolis, county of Hennepin, State of Minnesota, have invented certain new and useful Improvements in Portable Loaders, of which the following is a specification.

My invention relates to devices for loading grain shocks, hay or similar material on portable or wheeled receptacles adapted to be driven in fields or other similar places to collect the material and carry it to places of common deposit, and the invention particularly relates to the type of loading devices in which a swinging fork is used to gather the material on the ground and pitch or elevate it into the receptacle as the loader is moving over the ground. Heretofore such devices have derived the power to pitch the material from the ground wheels of the apparatus, but it has been found in practice that the power thus derived is insufficient to collect and elevate the material with the necessary rapidity and the result is frequent excessive slippage of the wheels and complete stoppage of the machine.

The object of the invention is to provide a source of power independent of the ground wheels and a simple and effective power transmitting device for operating the fork and controlling its movements.

Further objects are to have the ground wheels furnish the power to start the motive power, preferably an internal combustion engine and to provide easy and convenient control of the machine for the operator.

Other objects will appear from the following detailed description and the invention consists generally in improved construction and combination of parts which will hereinafter appear in the specification and will be more particularly pointed out in the claims.

In the accompanying drawings I have illustrated a simple and preferred form of the invention, it being however, understood that alterations and modifications of construction, coming within the scope of the invention may be made if desired.

In the drawings Figure 1 is a longitudinal vertical section of a portable loader embodying my invention, the section being taken on the line 1—1 of Fig. 2, Fig. 2 is a plan view of Fig. 1, Fig. 3 is a plan view of the main operating parts of the machine, partly in section, Fig. 4 is a vertical section on the line 4—4 of Fig. 3, Fig. 5 is a sectional view on the line 5—5 of Fig. 4, Fig. 6 is a similar section taken at 6—6 of Fig. 2, Fig. 7 is a detail of the controlling mechanism, Fig. 8 is a transverse section on the line 8—8 of Fig. 3, Fig. 9 is a detail of one of the operating levers.

In the drawing 10 are the supporting or ground wheels mounted upon a suitable axle 11, secured to a base frame 12. A suitable receptacle or rack 13 is preferably pivoted to the base frame 12 and 14 and may be tilted to the position shown in dotted lines in Fig. 1 for the purpose of dumping the loaded material but as the dumping or unloading mechanism forms no part of the present invention it is not thought necessary to fully illustrate or describe this feature.

The base frame 12 extends forward beyond the rack 13 and is at its forward end supported by the caster wheel 15, mounted in a forked frame 16. Tongues 17 for the guidance of the loader are rigidly secured to the frame 12 and equalizing bell crank levers 18 are pivoted to the frame 12 at 18$^a$ and connected by a transverse rod 19. Suitable whiffletrees 19$^a$ are connected to the equalizers 18 to which draft animals may be hitched for propelling the loader. Standards 20, supported by braces 21 are rigidly secured to the frame 12 and are connected at their upper ends by a cross bar 22. Brackets 23 are secured to the bar 22 and pins 24 form the pivots for the forwardly extending fork arms 25, having at their outer ends the tines 26. A transverse plate 27, having a series of slightly curved tines 28, preferably fastened to the plate by means of clips 29, is secured to the fork arms 25 as by bolts 30 and together with the arms 25 comprise a rigid fork frame, that is normally resting in a forwardly inclined position and may be elevated to a vertical position as will be hereinafter described. Curved channel bars 31 and 31$^a$ having external and internal gear segments 32 and 33 respectively are securely fastened to the fork arms 25 by flanges 34 and bolts 35. The centers for the arc of the gear segments are the pivot pins 24 and the segments being connected by curved gear sections 36, practically constitute a single endless gear rack. A curved rib or flange 37 is arranged midway between the gear and terminates at each end near the center for the arc of the semi-circular gear sections 36. Pinions 38, fastened to a swinging shaft 39 mesh with the gear rack and projecting ends 39$^a$ of this shaft are guided by the flanges 37 to keep the gears in mesh. The shaft 39 is mounted in bearings in swinging arms 40 and 41, the arm 40 being secured to a shaft 42 and the arm 41 being pivoted to a bracket 43 axially in line with the shaft 42 as shown in Figs. 2, 5 and 6. The shaft 42 is mounted in bearings 44 on the frame 12 and carries a sprocket 45 driven by a chain 46, and a pinion 47 meshing with a gear 48 on the swinging shaft 39, drives this shaft and the pinions 38. The chain 46 is driven from a sprocket 49 on a clutch 50 and this clutch is loosely mounted on the crank shaft 51 of the engine 52. The clutch is preferably of the disk type and being of any preferred or standard construction is not illustrated in detail. It will be understood, however, that when the clutch lever 53 is moved to the right in Fig. 4 as shown in dotted lines the clutch members are engaged to rotate the sprocket 49. A link 54 connects the clutch lever with an arm 55, on a rock shaft 56 mounted in standards 57 and when this shaft is rocked by means of a hand lever 58 to the position shown in full lines in Fig. 4 the clutch is released and the sprocket 49 comes to a stop while the engine may continue to run.

To the rock shaft 56 is also securely fastened a depending arm 59, and a dog 60 is pivoted to this arm at 61, its upper end 62 normally bearing against a lug 63 on the arm 59 to prevent swinging of the dog in one direction. The lower end of the dog projects downward into the path of a lug 64 secured to the segmental channel bar 31 for reasons which will be hereinafter described. Referring to Figs. 3 and 8, the engine shaft 51 extends through the clutch 50 and is beyond the clutch provided with a sleeve 65 having jaws 66 and a starting shaft 67 has a bearing 68 on the frame 12 and preferably also a bearing in the sleeve 65. A pin 69 in the shaft 67 is adapted to engage the jaws 66 when the shaft is moved to the right in a position to start the engine. A flanged collar 70 is secured to the shaft 67 and is engaged by an arm 71 pivoted to the bracket 72 on frame 12. A rod 73 connects the arm 71 with an operating hand lever 74, convenient to the driver's seat 75 and being pivoted to the frame 12 at 76 and provided with a quadrant 77 and locking device 78. The starting shaft 67 carries a loosely mounted sprocket 79, being held in place on the shaft by a clip 80 engaging a groove 81 in the hub of the sprocket. A clutch 82, preferably of the saw tooth type is provided on the sprocket 79 and the other member of the clutch is contained in a clutch collar 83 secured to the shaft 67. A sprocket 84 is fastened to the ground wheel 10 and a chain 85 connects the sprockets 84 and 79.

The operation of the machine is as follows:

The front caster wheel 15 adapts the machine for easy turning in any direction. In driving from the place of deposit to the loading place, the clutch 83 is preferably out of engagement as shown in Figs. 3 and 8 and the sprocket 79 is turning idle on the shaft 67. Before loading begins the lever 74 in Fig. 9 is thrown to the right by the driver, connecting the clutches 82 and 83 and engaging the pin 69 with the jaw 66 of the sleeve 65. This results in turning over the crank shaft 51 and starting the engine. As soon as the engine starts the pin 69 is automatically released from the jaw 66 and the clutch 83 is thereby disengaged, stopping the shaft 67. The loading lever 58 is at this time in the full line position in Fig. 4, the clutch 50 being released and the fork resting on the shaft 39 and links 40 and 41, through the gears 38 and gear flanges 36. The loader is guided by the driver so that the tongues 17 pass on either side of the shocks of grain or other material on the ground and the tines of the fork being close to the ground will pass under the shock until the bundles rest against the inclined plate 27. At this time the driver throws the lever 58 to the dotted line position in Fig. 4 engaging the clutch 50 and rotating the sprocket 49 and 45 and shafts 42 and 39 through the gears 47 and 48. As the pinions 38 on the shaft 39 rotate in the direction of the arrow in Fig. 4 the mesh of the gear teeth causes the internal gear segment 33 to travel upward, the shaft end 39$^a$ bearing against the rib 37 keeping the teeth in mesh. As the channel bars 31 are elevated carrying the loaded fork to the vertical dotted line position in Fig. 1 the bundles are thrown over in the rack 13 and as the gear 38 just at this time has reached the lower semi-circular gear section 36 it travels around in a semi-circle, until it meshes with the external gear segment 32 and by thus reversing the movement of the channel bars 31 it returns the parts to the position in Fig. 4. To prevent rebound it is essential that the driving power should be released from the gears 38 slightly before it again reaches the upper semi-circular gear section 36 and to this end the lug 64 (see Fig. 7) engages the dog 60, shortly before the end of the downward movement of the bars 31, and restores the lever 58 to its original position. The clutch is then released and the bars 31 and fork come to a gradual rest in a position ready to pick up the next shock, with the fork arms 25 preferably resting on the frame 12. When the rack 13 has been loaded the engine may be stopped, while carrying the load to the dumping place and in returning the operation above described is repeated.

I claim as my invention:

1. In a portable loader, the combination with a frame having wheeled ground supports and a receptacle supported upon said frame, of a loading fork, normally extending below and forward of said receptacle and having arms pivoted axially transverse to said frame, a motor shaft mounted upon said frame, a normally stationary starting shaft for said motor shaft mounted concentric to said shaft, transmitting means for rotating said starting shaft from said wheeled ground supports, a clutch included in said transmitting means, manually operated means for engaging the clutch to rotate the starting shaft and the motor shaft, automatically operated means for disengaging the clutch when said motor is operating, a clutch connected to said motor and means coöperating with said motor, said clutch and said fork arms for periodically raising and lowering said fork.

2. In a loading apparatus, the combination, with a frame and a receptacle, of a loading fork having arms pivoted to said frame and normally extending in front of said receptacle, opposing internal gear segments forming curved racks rigidly connected to said fork arms and having the pivot for said arms the center of their oscillation, a pinion mounted on said frame and meshing with one of said gear segments, a source of power, means for rotating said pinion from said source of power and causing said gear segment and fork to travel in the arc of a circle, and means for shifting said pinion from one gear segment to the other to reverse the travel of the gear segment and fork.

3. In a loading apparatus, the combination with a frame and receptacle, of a loading fork having arms pivoted to said frame and extending in front of said receptacle, a curved rack rigidly connected to said fork arms, said rack comprising internal gear segments in opposing relation having a common center around which they oscillate and being integrally connected by semi-circular internal gear portions to form an endless track, a pinion mounted in movable bearings on said frame and meshing with said rack, a source of power, means for rotating said pinion from said source of power and a curved member arranged between said internal and external gear segments for holding said pinion in continuous mesh with said gear rack.

4. In a loading apparatus, the combination, with a frame and a receptacle, of a fork having arms pivoted to said frame, internal gear segments forming an endless curved gear rack rigidly connected to said fork arms, a pinion mounted in movable bearings on said frame and meshing with said endless rack, a motor, means for transmitting power from said motor to said pinion to raise and lower the fork, a clutch adapted to engage said transmitting means, a lever controlling said clutch and means connected to said rack for operating said lever to disengage the clutch from the transmitting means when the former is being lowered.

5. In a loading apparatus, the combination, with a frame and a receptacle, of a fork having arms pivoted to said frame and extending in front of said receptacle, a curved rack having internal gears forming an endless curved track rigidly connected to said fork arms, a pinion mounted in movable bearings on said frame and meshing with the teeth of said rack, a motor, means for transmitting power from said motor to said pinion to raise and lower said rack, a clutch for connecting said transmitting means to said motor, a lever controlling said clutch, a latch on said lever inoperative to move the lever in one direction, and a lug on said rack engaging said latch to move the lever and disengage the clutch when said rack is being lowered.

6. A machine of the class described comprising a wheeled frame, a bundle receptacle mounted thereon, a pivoted loading fork projecting forwardly from said frame, a curved rack connected with said fork and having an endless gear formed therein, a pinion meshing with said rack, a motor mounted on said frame and driving connections between said motor and said pinion for positively raising and lowering said fork.

7. A machine of the class described comprising a frame having carrying wheels, a bundle receptacle mounted thereon, a pivoted loading fork projecting forwardly from said frame, a curved rack connected with said fork and having an endless gear therein, a pinion meshing with said gear, forward movement of said pinion alternately raising and lowering said fork, and a mechanism for operating said pinion.

8. In a loading apparatus, the combination, with a frame and a receptacle, of a fork having arms pivoted to said frame and extending in front of said receptacle, a curved rack having internal gears forming an endless curved track rigidly connected to said fork arms, a pinion mounted in movable bearings on said frame and meshing with the teeth of said rack, a motor, means for transmitting power from said motor to said pinion to raise and lower said rack, a clutch for connecting said transmitting means to said motor and a lever controlling said clutch.

9. In a loading apparatus, the combination, with a frame and a receptacle, of a fork having arms pivoted to said frame and extending in front of said receptacle, a curved rack having internal gears forming an endless curved track rigidly connected to said fork arms, a pinion mounted in movable bearings on said frame and meshing with the teeth of said rack, a motor, means for transmitting power from said motor to said pinion to raise and lower said rack, a clutch for connecting said transmitting means to said motor and a lever controlling said clutch, a locking latch for said lever and means in connection with said rack for tripping said latch to operate said lever and disengage the clutch when the rack is being lowered.

10. A portable loader comprising a frame having ground supports, a receptacle supported upon said frame, a loading fork projecting forwardly of said receptacle and pivoted for a tilting movement, a motor mounted upon said frame, a transmitting mechanism between said motor and fork and a clutch therefor, a controlling lever for said clutch, a latch for said lever, and means in connection with said fork for engaging said latch to operate said lever and disengage the clutch when the fork is being lowered.

11. A portable loader comprising a frame having rear carrying wheels and a tilting receptacle mounted thereon, a loading fork pivoted on the forward portion of said frame and adapted to be tilted to discharge articles into said receptacle, a motor mounted on the forward portion of said frame in front of said tilting receptacle, mechanism connecting said motor and said fork for raising and lowering said fork, a controlling lever for said mechanism, and draft connections for said frame.

12. A portable loader comprising a frame having rear carrying wheels, a tilting receptacle mounted thereon, a fork pivoted on the forward portion of said frame and having arms adapted to gather up material on the ground and deposit it in said receptacle, a motor mounted on the forward portion of said frame in front of said tilting receptacle, mechanism connecting said motor with said fork for positively raising and lowering it, a motor controlling the movement of said mechanism, draft connections for said frame, and means connecting one of said carrying wheels with the motor shaft for starting the motor through the forward movement of the machine.

In witness whereof, I have hereunto set my hand this 15″ day of May 1919.

DE WITT NELSON.